(12) United States Patent
Joshi et al.

(10) Patent No.: US 12,463,506 B2
(45) Date of Patent: *Nov. 4, 2025

(54) SYSTEMS AND METHODS FOR COOLING AN ELECTRIC AIRCRAFT

(71) Applicant: Toyota Motor Engineering & Manufacturing North America, Inc., Plano, TX (US)

(72) Inventors: Shailesh Joshi, Ann Arbor, MI (US); Danny Lohan, Northville, MI (US); Feng Zhou, Ann Arbor, MI (US); Jae Seung Lee, Ann Arbor, MI (US); Hiroshi Ukegawa, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/503,470

(22) Filed: Nov. 7, 2023

(65) Prior Publication Data

US 2025/0149955 A1 May 8, 2025

(51) Int. Cl.
*H05K 7/20* (2006.01)
*B64C 29/00* (2006.01)
(Continued)

(52) U.S. Cl.
CPC ......... *H02K 9/225* (2021.01); *B64C 29/0008* (2013.01); *B64D 33/08* (2013.01);
(Continued)

(58) Field of Classification Search
CPC .............. F28D 15/0275; F28D 15/02; F28D 2021/0021; F28D 15/04; B64U 10/13;
(Continued)

(56) References Cited

U.S. PATENT DOCUMENTS

| 6,062,302 A * | 5/2000 | Davis | F28D 15/046 165/185 |
| 6,237,223 B1 * | 5/2001 | McCullough | B22F 3/1103 29/890.032 |

(Continued)

FOREIGN PATENT DOCUMENTS

| CN | 215935354 U | 3/2022 |
| DE | 10 2018 132 145 | 6/2020 |

(Continued)

*Primary Examiner* — Mandeep S Buttar
(74) *Attorney, Agent, or Firm* — DINSMORE & SHOHL LLP (57) ABSTRACT

The present disclosure is directed to systems and methods for cooling an electric aircraft. The system comprises an electronic device, a casing, a fin, and at least one PHP. The casing comprises an inner surface. A PHP may be coupled to the inner surface. The fin comprises a fin interior cavity. A PHP may be embedded within the fin interior cavity. The same PHP may be both coupled to the casing inner surface and embedded within the fin interior cavity, or there may be a plurality of fins such that at least one fin is coupled to the casing inner surface and at least one fin is embedded within the fin interior cavity. The portion of the PHP closest to the electronic device comprises an evaporator section and the portion of the PHP furthest from the electronic device comprises a condenser section.

20 Claims, 7 Drawing Sheets

(51) Int. Cl.
 *B64D 33/08* (2006.01)
 *H02K 5/18* (2006.01)
 *H02K 9/20* (2006.01)
 *H02K 9/22* (2006.01)
 *H02K 11/33* (2016.01)

(52) U.S. Cl.
 CPC ............... *H02K 5/18* (2013.01); *H02K 9/20* (2013.01); *H02K 11/33* (2016.01)

(58) Field of Classification Search
 CPC ....... B64U 30/20; B64U 20/80; H01L 23/427; H05K 7/20336; H05K 7/20409
 USPC ................................................. 361/679.52
 See application file for complete search history.

(56) References Cited

U.S. PATENT DOCUMENTS

| | | | |
|---|---|---|---|
| 8,123,460 B2 | 2/2012 | Collette | |
| 9,272,777 B2 | 3/2016 | McGlaun et al. | |
| 10,794,637 B2 * | 10/2020 | Swanson | F28F 3/02 |
| 12,195,193 B2 * | 1/2025 | Tepe | H02K 15/03 |
| 12,246,647 B2 * | 3/2025 | Peterson | B60R 1/04 |
| 2018/0072431 A1 | 3/2018 | Sahu et al. | |
| 2018/0170553 A1 * | 6/2018 | Wang | B64U 20/80 |
| 2019/0009878 A1 * | 1/2019 | Wang | B64U 20/92 |

FOREIGN PATENT DOCUMENTS

| | | |
|---|---|---|
| EP | 3 823 018 | 5/2021 |
| GB | 2537950 | 11/2016 |
| JP | 2021-97294 | 6/2021 |
| KR | 10-2018-0009218 | 1/2018 |

* cited by examiner

SYSTEMS AND METHODS FOR COOLING AN ELECTRIC AIRCRAFT

BACKGROUND

Field

The present disclosure relates to systems and methods for cooling an electric aircraft.

Technical Background

Electric aircraft rely on motors to generate lift and/or thrust. Electric aircraft also use a variety of other electronic devices to control aircraft functions and complete various tasks. One type of electric aircraft can be an electric vertical takeoff and landing vehicle (eVTOL). These electronic devices can be packaged together within a casing. These electronic devices can generate significant heat which requires cooling in order to keep the electronics within their optimal operating temperature range. Conventional cooling systems can involve using the surface of the casing and cooling fins to spread heat, among other types of cooling devices. Conventional cooling systems can result in poor heat spreading capability around the surface of the package of electronics, which can result in lower cooling effectiveness and lower electronic functionality.

SUMMARY

Electronic devices generate heat during operation. As electronic devices are operated in more demanding situations, they will generate more and more heat. In order to operate effectively, electronic devices should be maintained within an ideal operating temperature range. Thus, electronic devices should be cooled. Oftentimes electronic devices are surrounding by protective casings which can help to prevent damage to the electronic devices but which can further trap the heat generated by the electronic devices. Casings may utilize cooling systems to try to cool off the electronic devices. A conventional cooling system can involve the use of the surface area of the casing itself to spread heat out as well as the use of cooling fins. However, conventional cooling systems can result in poor heat spreading along the casing and along the fins where the majority of the heat remains at the portion of the casing and fins closest to the heat source and little heat spread to the portion of the casing and fins furthest from the heat source. This results in an inefficient use of the casing surface area and fin surface area as the entirety of the surface area is not used for cooling. This effect is particularly relevant on electronic aircraft where a motor providing lift or thrust can generate a significant amount of heat because of the high power draw needed to power an electric aircraft. Therefore, there exists a need for a cooling system with increased cooling capacity in the same amount of space as conventional cooling systems to keep up with the cooling demands of an electronic aircraft.

The present system can be a more efficient cooling system than conventional cooling systems by utilizing pulsating heat pipes (PHPs) in conjunction with a heat spreader casing and cooling fins. PHPs may also be referred to as oscillating heat pipes (OHPs). PHPs include a channel which has an evaporator section and a condenser section. A refrigerant is disposed within the channel. The refrigerant can travel between an evaporator section and a condenser section, transforming between vapor phase and liquid phase. Such transformation can absorb and release heat, resulting in heat being absorbed from the electronic devices and released into an airflow at an end of the fin or casing a distance from the heat source. This can provide the advantage of higher heat transfer capability, spreading of high heat flux, ability to withstand g-forces experienced by an aircraft, performance insensitivity to orientation, and simplicity of structure.

The system includes a casing, wherein the casing includes a casing interior cavity and a casing inner surface, at least one electronic device, at least one cooling fin attached to the casing wherein the fin includes a fin interior cavity, and at least one PHP coupled to the casing inner surface and embedded within the fin interior cavity. The system may also include a plurality of PHPs wherein at least one PHP is coupled to the casing inner surface and at least one PHP is embedded within the fin interior cavity. A portion of the PHP closest to the electronic device generating heat and within the second casing width can serve as an evaporator section of the PHP. A portion of the PHP furthest from the electronic device generating heat and within the first casing width as well as the portion of the PHP within the fin can serve as a condensing section of the PHP.

According to one embodiment, an electric motor assembly includes a motor having an end face, where the motor is within the motor housing, an electronics assembly disposed on the end face of the motor housing, including a casing defining a casing interior cavity, where the casing interior cavity houses at least one electronic device, where the casing includes an inner surface and an outer surface, and one or more fins protruding from the casing outer wall, wherein the one or more fins includes a fin width and a fin interior cavity, and at least one pulsating heat pipe wherein at least a portion of the pulsating heat pipe is coupled to the casing inner surface and at least a portion of the pulsating heat pipe is embedded within the fin interior cavity.

According to another embodiment, an electric vertical takeoff and landing (eVTOL) vehicle includes an electric motor assembly including a motor having an end face, where the motor is within the motor housing, an electronics assembly disposed on the end face of the motor housing, including a casing defining a casing interior cavity, where the casing interior cavity houses at least one electronic device, where the casing includes an inner surface and an outer surface, and one or more fins protruding from the casing outer wall, wherein the one or more fins includes a fin width and a fin interior cavity, and at least one pulsating heat pipe wherein at least a portion of the pulsating heat pipe is coupled to the casing inner surface and at least a portion of the pulsating heat pipe is embedded within the fin interior cavity.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of the present disclosure may be better understood when read in conjunction with the following drawings in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to a system that couples a PHP to a casing inner surface which houses electronic devices as well as within the width of a fin so as to increase the heat spreading efficiency of the casing and fin. The portion of the PHP closest to the heat source serves as the evaporator section. The portion of the PHP furthest from the heat source and placed within the air flow of the electronic aircraft serves as the condenser section. This arrangement allows for more uniform heat spreading throughout the casing and fin, and more cooling capacity to remove heat from the electronic device.

The PHP can have a complete loop such that the internal contents can be passed from the evaporator section to the condenser section, back to the evaporator section, and so on. In some embodiments, the PHP can be arranged in a winding manner such that a single PHP can include multiple condenser sections and multiple evaporator sections all within a single PHP.

The term "evaporator" refers to the portion of the PHP where liquid is converted from a liquid to a gas, absorbing heat. The term "condenser" refers to the portion of the PHP where gas is converted from a gas to a liquid, releasing heat.

Conventional cooling systems can limit heat spread and concentrate heat at the portion of the casing and fin closest to the heat source. This does not efficiently use the full area of the casing and fin as heat is not dissipated across the entire casing and fin, and also removes less heat from the heat source the casing and fin are designed to cool compared to the present system. Embodiments can more effectively transfer heat throughout the entire casing and fin to more efficiently use the total area of the casing and fin and to increase the spread of heat throughout the entire casing and fin compared to conventional cooling systems. The present system can also disperse more heat away from the heat source compared to conventional cooling systems.

Figure 1:
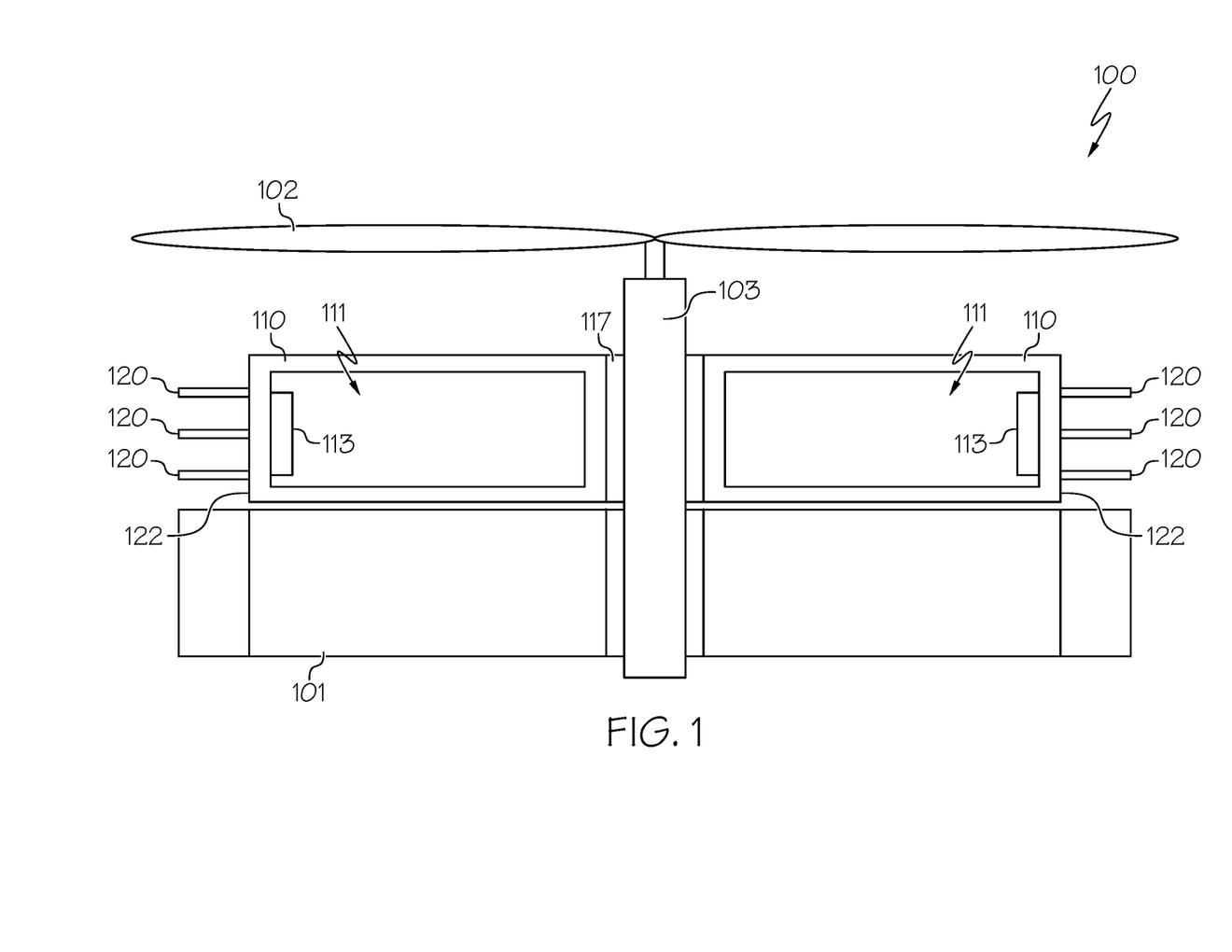
FIG. 1 schematically depicts a front section view of a motor, a casing, a plurality of fins, and a propeller assembly, according to one or more embodiments shown and described herein.

Referring now to FIG. 1, an example embodiment of the system 100 is shown. System 100 includes a casing 110, a motor 101, one or more electronic devices 113, a propeller 102, and a propeller shaft 103. The electronic devices 113 are disposed within the casing interior cavity 111 (i.e. an enclosure). A plurality of fins 120 extend from the outside of the casing 110. The propeller shaft 103 is coupled to the motor 101 and the propeller 102. Casing 110 may have a pass through 117 to allow the propeller shaft 103 to pass from motor 101 to propeller 102. Propeller 102 may provide lift, thrust, or a combination of lift and thrust. Any number of fins 120 may be included. It should be understood the arrangement of components of the system of FIG. 1 is for illustrative purposes, and that other arrangements are possible.

The plurality of electronic devices 113 in the casing interior cavity 111 can be one or more different electronic devices 113. The plurality of electronic devices 113 can be included in an inverter circuit, a gate drive and/or the like. The plurality of electronic devices 113 may include a capacitor, an insulated-gate bipolar transistor, a power MOSFET, or any other electronic devices. The electronic devices 113 can be the heat source of the system 100, wherein the electronics generate heat during operation.

The casing 110 surrounding the plurality of electronic devices 113 can be any number of shapes, including but not limited to a cylinder, a toroid, or a rectangular prism. The casing 110 can be made of any number of materials, including but not limited to aluminum. The casing 110 includes at least one wall 122 and a casing interior cavity 111. In some embodiments, there may be a plurality of casings 110 arranged together wherein each casing 110 has at least one fin 120 attached to it.

The fin 120 can be mounted to the casing 110 or be integrated with the casing 110. The fin 120 can be mounted to the casing 110 by various methods, including but not limited to soldering, brazing, and welding. In some embodiments, the fin 120 and the casing 110 may be made from a single piece of material. The fin 120 can be any number of shapes, including but not limited to a cylinder or a rectangular prism.

Figure 2:
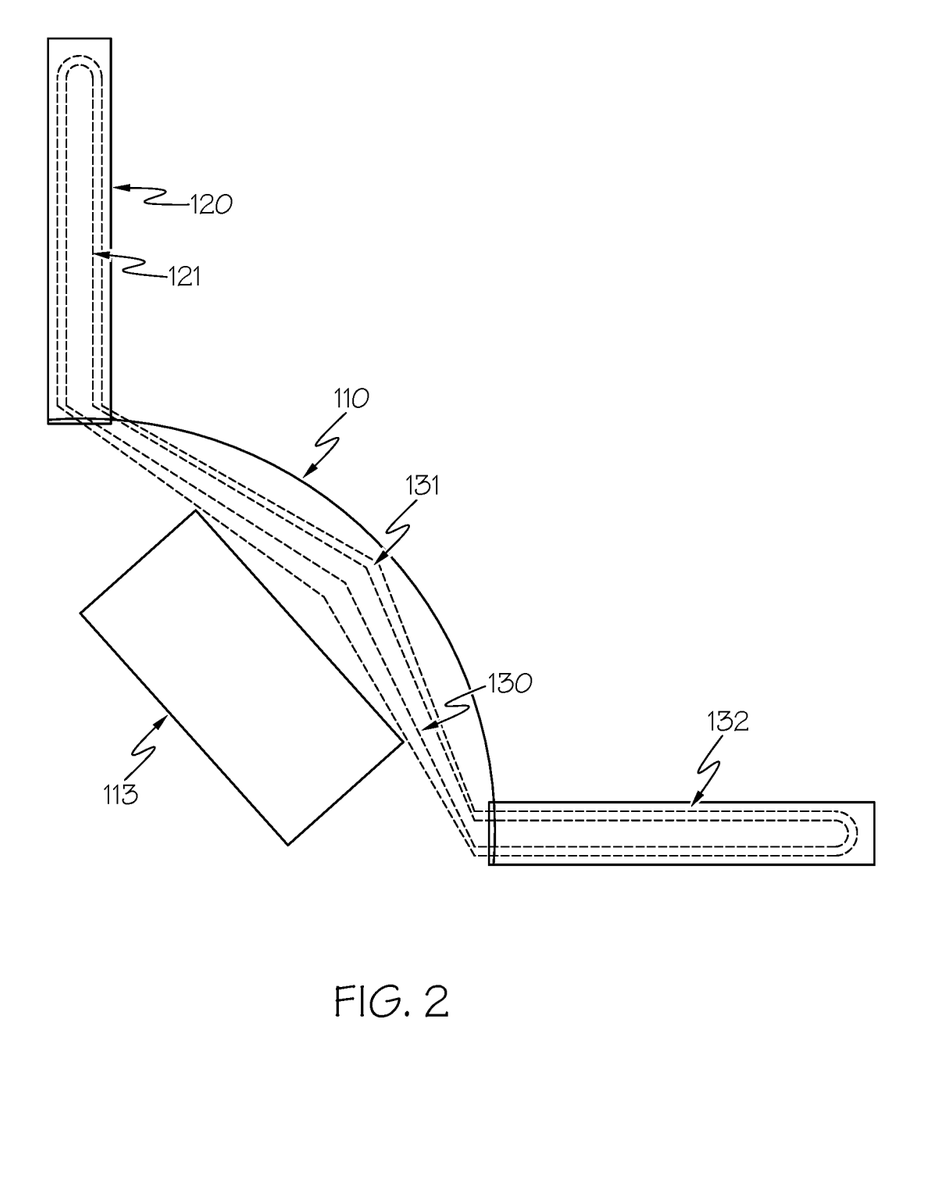
FIG. 2 schematically depicts a simplified pulsating heat pipe coupled to a casing inner surface and embedded within a plurality of fins, according to one or more embodiments shown and described herein.

Referring now to FIG. 2, a single simplified pulsating heat pipe 130 coupled to a casing inner surface 115 (not shown) and embedded within a plurality of fins 120 is shown. The single PHP is embedded within the fin interior cavity 121. The evaporator section 131 of the PHP 130 is adjacent to the electronic device 113 on or within a casing inner surface 115. As the electronic device 113 generates heat during operation, this heat is transferred to the evaporator section 131 of the PHP 130. The condenser section 132 of the PHP 130 is away from the electronic device 113 and in the airflow of propeller 102 (not shown).

In the embodiment shown in FIG. 2, the PHP 130 is embedded within two fins 120 and a portion of the casing 110. It should be understood that the PHP 130 can be embedded within any suitable number of fins 120. In other embodiments, the system 100 may include a plurality of PHPs 130. Each of the plurality of PHPs 130 can be embedded in a single fin 120 per PHP 130 such that the number of fins 120 is equal to the number of PHPs 130 in the system 100.

In yet other embodiments, there can be a plurality of PHPs 130 where each PHP 130 can be embedded within multiple fins 120. As non-limiting examples, there could be six PHPs 130 and twelve fins 120 or five PHPs 130 and fifteen fins 120.

In yet other embodiments, there can be multiple condenser sections 132 embedded in a single fin 120 and multiple evaporator sections 131 coupled to the casing inner surface 115 between each fin 120.

Figure 3:
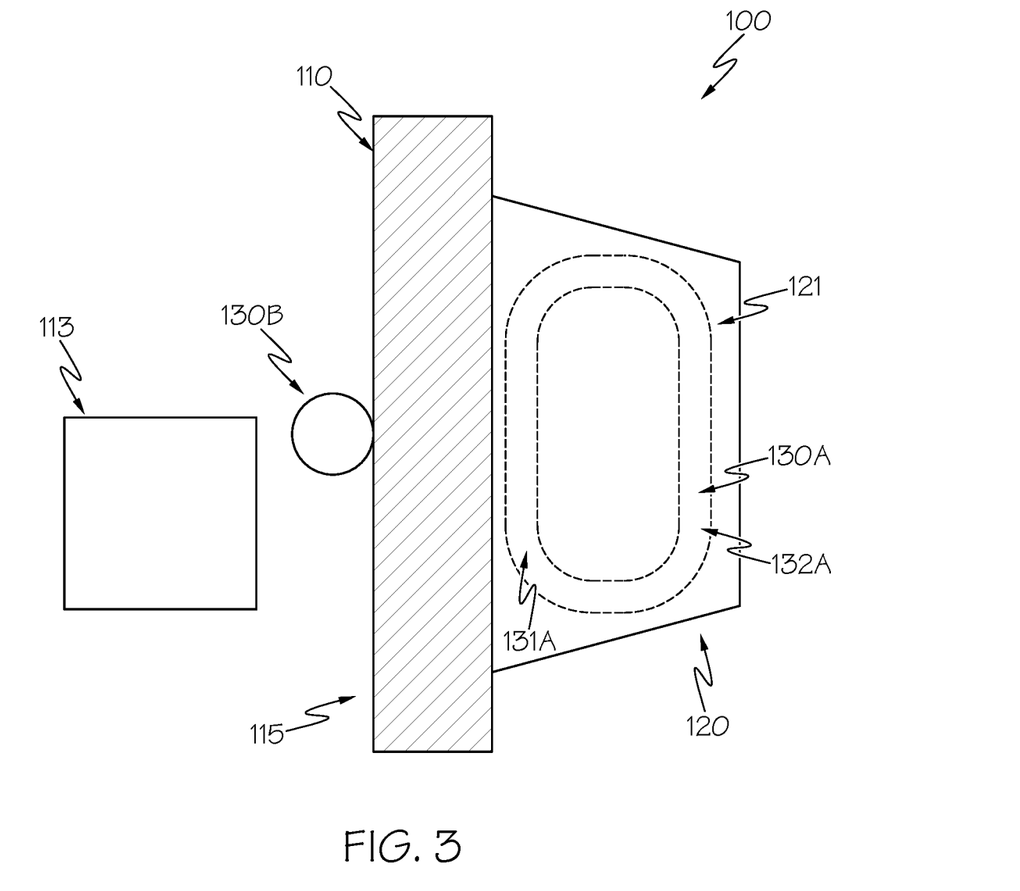
FIG. 3 schematically depicts a pulsating heat pipe embedded within a fin, and a pulsating heat pipe coupled to the casing inner surface, according to one or more embodiments shown and described herein.

In some embodiments, separate PHPs 130 may be in the casing 110 and the fin 120. Referring now to FIG. 3, a plurality of pulsating heat pipes 130 are shown. One pulsating heat pipe 130A is embedded within the fin 120. The portion of the PHP 130A embedded in the fin closest to the casing may be an evaporator section 131A. The portion of the PHP 130A embedded in the fin furthest from the casing may be a condenser section 132A. Another PHP 130B is shown coupled to the casing inner surface 115. The pulsating heat pipe 130B coupled to the casing inner surface 115 may be coupled to the casing inner surface 115 by any number of methods, including but not limited to solder or thermal grease. The thermal grease may allow for more efficient heat transfer between the PHP 130B and the casing inner surface 115. The portion of the pulsating heat pipe 130B coupled to the casing inner surface 115 closest to the electronic device 113 may be an evaporator section 131B (not shown). The portion of the PHP 130B coupled to the casing inner surface 115 furthest from the electronic device 113 may be a condenser section 132A (not shown). In some embodiments, the PHP 130B can be inside the casing 110. Note that while a single PHP 130A is shown embedded in the fin 120 and a single PHP 130B is shown coupled to the casing inner surface 115, any number of PHPs 130A may be embedded in the fin 120 and any number of PHPs 130B may be coupled to the casing inner surface 115 or disposed inside the casing 110.

In some embodiments, there may be a plurality of PHPs 130 where separate PHPs 130 may be embedded within the fin 120 and attached to or disposed within the casing 110. In other embodiments, the same PHP 230 may be both embedded within a fin 220 and attached to or disposed within the casing 210.

Figure 4:
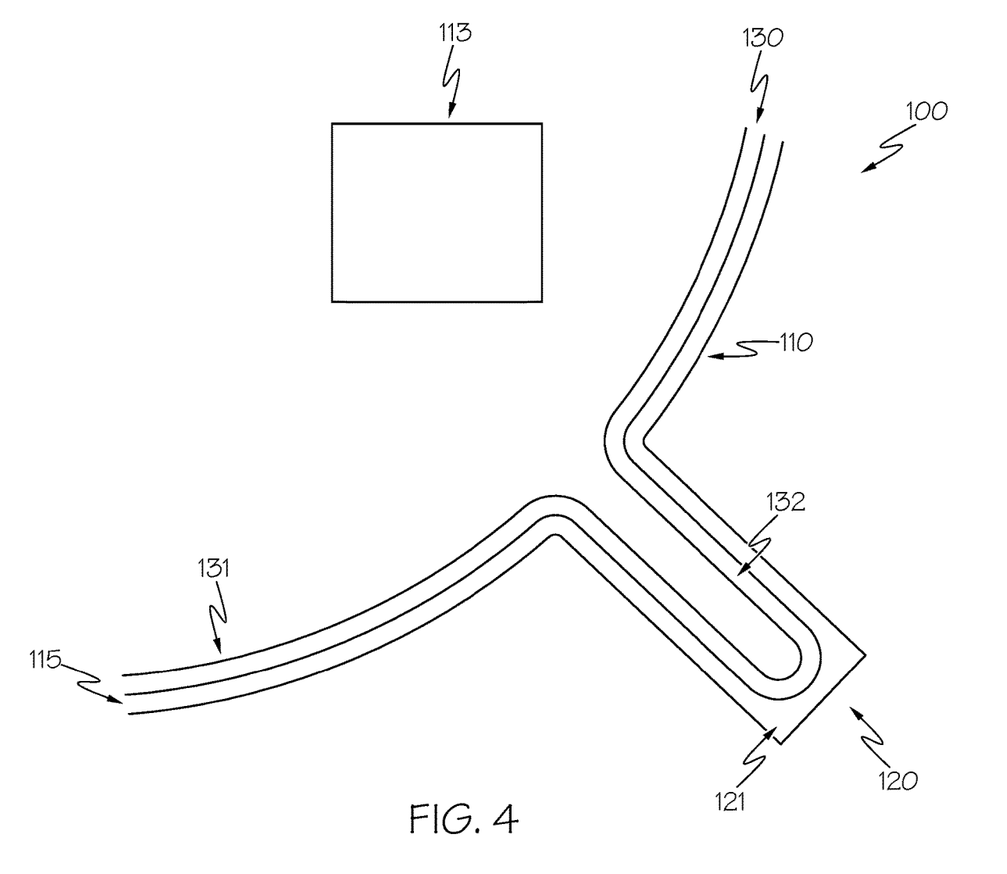
FIG. 4 schematically depicts a pulsating heat pipe embedded within a fin and coupled to the casing inner surface, according to one or more embodiments shown and described herein.

Referring now to FIG. 4, a top view of a section of a system 200 is shown. The casing 210 is shown in this embodiment as a cylindrical shape, but the casing 210 can be any number of different shapes in other embodiments. A single PHP 230 is coupled to the casing inner surface 215 and is embedded within the fin 220. The portion of the PHP 230 coupled to the casing inner surface 215 may be an evaporator section 231. The portion of the PHP 230 embedded within the fin 220 may be a condenser section 232. Note that while a single PHP 230 is shown, a plurality of PHPs 230 may be arranged in this manner. Also note that a single PHP 230 may span multiple fins 220 such that the PHP 230 spans a section of the casing inner surface 215, a fin 220, another section of the casing inner surface 213, another fin 220, and so on.

In some embodiments, there may be a plurality of PHPs 130 where separate PHPs 130 may be embedded within the fin 120 and attached to or disposed within the casing 110. In other embodiments, the same PHP 230 may be both embedded within a fin 220 and attached to or disposed within the casing. In yet further embodiments there may be one or more PHPs 330 where all of the one or more PHPs 330 are attached to or disposed within the casing 310.

In some embodiments, a system 300 includes the entire PHP may be attached to or disposed within the casing inner surface 315 (i.e., the PHP 330 is not embedded within a fin 320 in these embodiments). In this embodiment, the section of the PHP 330 coupled to the casing inner surface 315 closest to the electronic device 313 can be an evaporator section 331, and the section of the PHP 330 coupled to the casing inner surface 315 furthest from the electronic device 313 can be a condenser section 332. The portion of the casing 310 which is coupled to the condenser section 332 can be exposed to the airflow of the propeller 102 (not shown) to allow for cooling.

Figure 5:
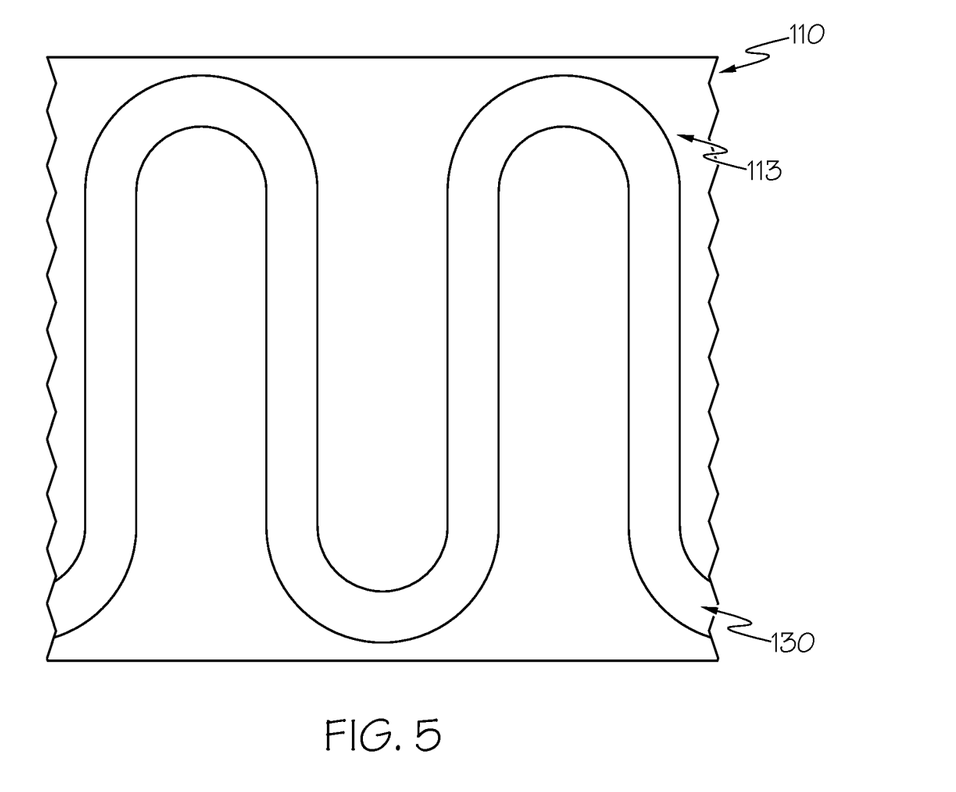
FIG. 5 schematically depicts a pulsating heat pipe coupled to a channel in the casing inner surface, according to one or more embodiments shown and described herein.

Referring now to FIG. 5, a PHP 130 is shown coupled to the casing inner surface 115. The PHP 130 may be arranged in any number of configurations, such as the winding pattern as shown in this embodiment. The PHP 130 may also be arranged in other embodiments along the casing inner surface including but not limited to axially around the perimeter of the casing inner surface 115, diagonally across the casing inner surface 115, or any other arrangement. In another embodiment, the PHP 230 may also be arranged in a similar manner as the PHP 130 is arranged as described above. In yet another embodiment, the PHP 330 may also be arranged in a similar manner as the PHP 130 is arranged as described above.

Figure 6:
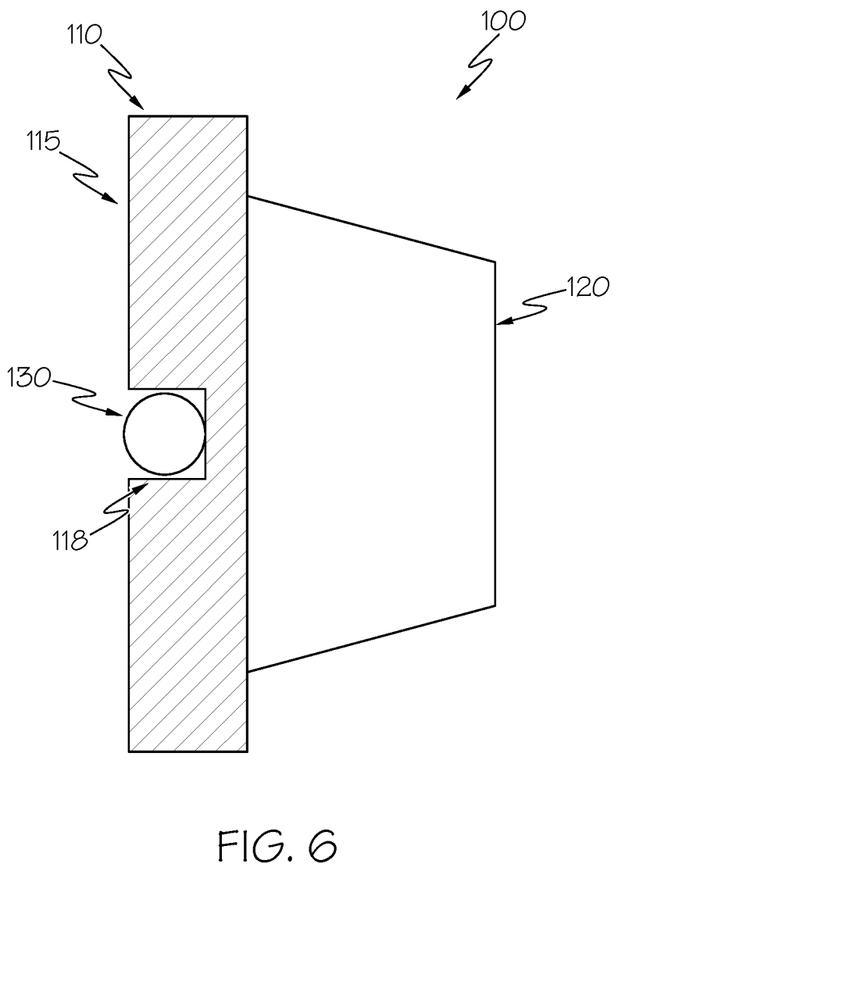
FIG. 6 schematically depicts a pulsating heat pipe coupled to a channel in the casing inner surface, according to one or more embodiments shown and described herein.

Referring now to FIG. 6, a PHP 130 is shown disposed in a channel 118 in the casing inner surface 115. The channel 118 and the fin interior cavity 121 (not shown) may be integrated by 3D printing. The integration may involve 3D printing the casing 110 wherein the printing process leaves a channel 118 in the casing inner surface 115 wherein the channel 118 is left at the same height along the casing inner surface 115 as the height of the fin interior cavity 121. In other embodiments, the integration by 3D printing of the channel 118 and the fin interior cavity 121 may also involve 3D printing a channel 118 to correspond to one of the orientations of the PHP 130 as disclosed in FIG. 5, including but not limited to diagonally or a winding arrangement, further including the channel 118 having an opening adjacent to the fin interior cavity 121. The channel 118 may be of adequate size such that the PHP 130 is insertable within the channel 118. The channel 118 may be any number of cross sectional shapes, including but not limited to rectangular, circular, or any other cross sectional shape. In addition to 3D printing, the channel and the fin interior cavity may be integrated by casting, machining, or any other suitable manufacturing technique. In another embodiment, the PHP 230 may also be disposed in the channel 118 in a similar manner as the PHP 130 is disposed in the channel 118 as described above. In yet another embodiment, the PHP 330 may also be disposed in the channel 118 in a similar manner as the PHP 130 is disposed in the channel 118 as described above.

Figure 7:
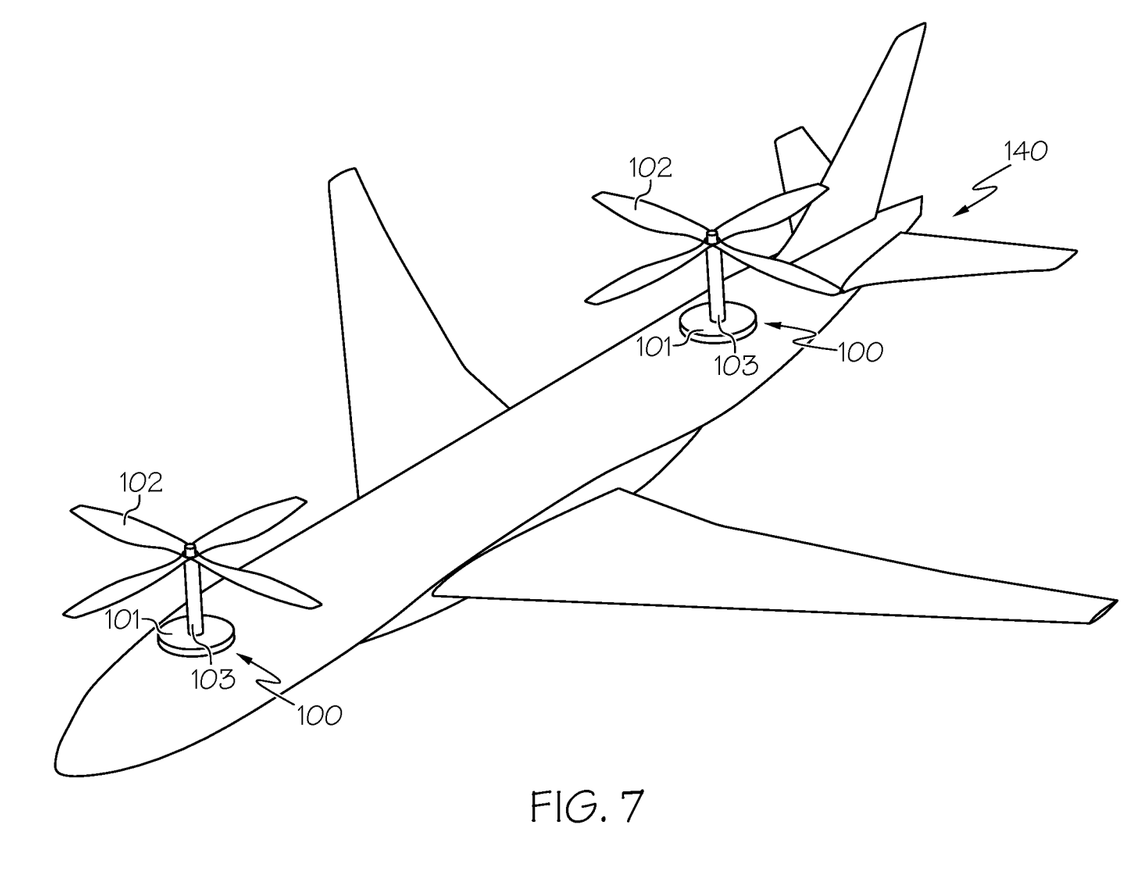
FIG. 7 schematically depicts the system configured for use on an eVTOL.

Referring now to FIG. 7, the system 100 is shown on an eVTOL 140. A plurality of motors 101 coupled by a plurality of propeller shafts 103 to a plurality of propellers 102 may be used. The eVTOL 140 may use the lift from the plurality of propellers 102 to vertically takeoff and land. The plurality of propellers 102 may also provide thrust such that the eVTOL 140 can move forward. The airflow from the propeller 102 may also provide airflow to the fins 120 of the system 100. The airflow may allow for PHP condenser section 132 to condense the refrigerant inside of each PHP 130, which can cool the electronic devices 113. The eVTOL 140 may also include system 200 or system 300. In some embodiments, the eVTOL 140 may include a plurality of motors 101 wherein the motors 101 include the system 200 or the system 300 to cool the motors 101. In other embodiments, the eVTOL 140 may include a mixture of any of the systems 100, 200, or 300 such that one motor 101 includes the system 100 and another motor 101 includes the system 200 and another motor 101 includes the system 300, or any other combination of the systems.

Accordingly a need exists for an enhanced cooling system for an electric aircraft that can fit in the same space as conventional cooling systems. The system includes at least one PHP. The at least one PHP can be coupled to a casing inner surface and embedded within a cooling fin which is attached to the casing. The fin and the casing can be integrated by 3D printing. 3D printing can allow for additional shapes and orientations of channels inside of the casing into which the PHP can be coupled. Such shapes and orientations may be difficult to manufacture with traditional manufacturing techniques, but can be more readily manufactured with 3D printing.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in casings where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. An electric motor assembly comprising:
a motor housing having an end face;
a motor within the motor housing;
an electronics assembly disposed on the end face of the motor housing, the electronics assembly comprising:
a casing comprising a casing interior cavity, an inner surface, and an outer surface, wherein the casing defines an enclosure;
at least one electronic device within the enclosure;
one or more fins protruding from the outer surface of the casing, wherein the one or more fins comprises a fin interior cavity; and
one or more pulsating heat pipes, wherein at least a portion of the one or more pulsating heat pipes is coupled to the casing inner surface and at least a portion of the one or more pulsating heat pipes is disposed within the fin interior cavity.

2. The electric motor assembly of claim 1, wherein the casing interior cavity is an evaporator for the one or more pulsating heat pipes and the fin interior cavity is a condenser for the one or more pulsating heat pipes.

3. The electric motor assembly of claim 1, wherein the at least one electronic device comprises a plurality of electronic devices positioned along a perimeter defined by the casing inner surface.

4. The electric motor assembly of claim 1, wherein the at least one electronic devices contact the casing inner surface.

5. The electric motor assembly of claim 1, wherein the plurality of electronic devices comprises an insulated-gate bipolar transistor.

6. The electric motor assembly of claim 1, further comprising:
a propeller shaft coupled to the motor and passing through an opening of the casing; and
a propeller coupled to the propeller shaft, wherein rotation of the propeller causes air to pass by the one or more fins.

7. The electric motor assembly of claim 1, wherein the PHP has multiple condenser sections and multiple evaporator sections within a single fin.

8. The electric motor assembly of claim 1, wherein the PHP is coupled to the casing inner surface by solder.

9. The electric motor assembly of claim 1, wherein the PHP is coupled to the casing inner surface by thermal grease.

10. The electric motor assembly of claim 1, wherein the casing comprises a channel wherein the PHP is insertable into the channel; and
the channel and the fin interior cavity are integrated by 3D printing.

11. An electric vertical takeoff and landing vehicle comprising:
an electric motor assembly comprising:
a motor housing having an end face;
a motor within the motor housing;
an electronics assembly disposed on the end face of the motor housing, the electronics assembly comprising:
a casing comprising a casing interior cavity, an inner surface, and an outer surface, wherein the casing defines an enclosure;
at least one electronic device within the enclosure;
one or more fins protruding from the outer surface of the casing, wherein the one or more fins comprises a fin interior cavity; and
one or more pulsating heat pipes, wherein at least a portion of the one or more pulsating heat pipes is coupled to the casing inner surface and at least a portion of the one or more pulsating heat pipes is disposed within the fin interior cavity.

12. The electric vertical takeoff and landing vehicle of claim 11, wherein the casing interior cavity is an evaporator for the one or more pulsating heat pipes and the fin interior cavity is a condenser for the one or more pulsating heat pipes.

13. The electric vertical takeoff and landing vehicle of claim 11, wherein the at least one electronic device comprises a plurality of electronic devices positioned along a perimeter defined by the casing inner surface.

14. The electric vertical takeoff and landing vehicle of claim 11, wherein the at least one electronic devices contact the casing inner surface.

15. The electric vertical takeoff and landing vehicle of claim 11, wherein the plurality of electronic devices comprises an insulated-gate bipolar transistor.

16. The electric vertical takeoff and landing vehicle of claim 11, further comprising:
a propeller shaft coupled to the motor and passing through an opening of the casing; and
a propeller coupled to the propeller shaft, wherein rotation of the propeller causes air to pass by the one or more fins.

17. The electric vertical takeoff and landing vehicle of claim 11, wherein the PHP has multiple condenser sections and multiple evaporator sections.

18. The electric vertical takeoff and landing vehicle of claim 11, wherein the PHP is coupled to the casing inner surface by solder.

19. The electric vertical takeoff and landing vehicle of claim 11, wherein the PHP is coupled to the casing inner surface by thermal grease.

20. The electric vertical takeoff and landing vehicle of claim 11, wherein the casing comprises a channel wherein the PHP is insertable into the channel; and the channel and the fin interior cavity are integrated by 3D printing.

\* \* \* \* \*